(12) United States Patent
Yao et al.

(10) Patent No.: US 12,032,146 B2
(45) Date of Patent: Jul. 9, 2024

(54) CAMERA LENS SYSTEM

(71) Applicant: Apple Inc., Cupertino, CA (US)

(72) Inventors: Yuhong Yao, San Jose, CA (US); Miodrag Scepanovic, San Jose, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 17/278,251

(22) PCT Filed: Sep. 20, 2019

(86) PCT No.: PCT/US2019/052244
§ 371 (c)(1),
(2) Date: Mar. 19, 2021

(87) PCT Pub. No.: WO2020/068594
PCT Pub. Date: Apr. 2, 2020

(65) Prior Publication Data
US 2021/0349295 A1    Nov. 11, 2021

Related U.S. Application Data

(60) Provisional application No. 62/736,394, filed on Sep. 25, 2018.

(51) Int. Cl.
*G02B 17/08*   (2006.01)
*G02B 13/00*   (2006.01)

(52) U.S. Cl.
CPC ....... *G02B 17/0856* (2013.01); *G02B 13/007* (2013.01)

(58) Field of Classification Search
CPC .... G02B 13/007; G02B 5/04; G02B 17/0856; G02B 17/08; G02B 13/00; G02B 17/086; G02B 13/0065
(Continued)

(56) References Cited

U.S. PATENT DOCUMENTS 6,084,715 A    7/2000  Aoki et al.
6,094,315 A    7/2000  Aoki
(Continued)

FOREIGN PATENT DOCUMENTS

CN    1419149    5/2003
CN    202306100  7/2012
(Continued)

OTHER PUBLICATIONS

Office action from Taiwan Application No. 108133821, dated Aug. 4, 2021, (English translation and Taiwan version), pp. 1-15.
(Continued)

*Primary Examiner* — Jie Lei
*Assistant Examiner* — Kuei-Jen L Edenfield
(74) *Attorney, Agent, or Firm* — Robert C. Kowert; Kowert, Hood, Munyon, Rankin & Goetzel, P.C.

(57) ABSTRACT

A folded optical system that comprises two prisms with refractive power and in which at least one surface of at least one of the prisms is not rotationally symmetric. The materials and surfaces of the prisms in the folded optical system may be selected to provide a low F-number (e.g., <=2.4), full field of view (FOV) of 30 degrees or less. The folded optical system may be implemented in a small package size while still capturing sharp, high-resolution images, making embodiments of a camera including the folded optical system suitable for use in small and/or mobile multipurpose devices.

20 Claims, 9 Drawing Sheets

(58) Field of Classification Search
USPC .............. 359/831, 833, 633, 631, 637, 630
See application file for complete search history.

(56) References Cited

U.S. PATENT DOCUMENTS

| | | | |
|---|---|---|---|
| 6,147,808 | A | 11/2000 | Togino |
| 6,166,858 | A * | 12/2000 | Togino .............. G02B 17/0848 |
| | | | 359/633 |
| 6,178,048 | B1 | 1/2001 | Togino et al. |
| 6,201,646 | B1 | 3/2001 | Togino et al. |
| 6,259,564 | B1 | 7/2001 | Kamo |
| 6,327,094 | B1 | 12/2001 | Aoki |
| 6,437,925 | B1 | 8/2002 | Nishioka |
| 6,760,164 | B2 | 7/2004 | Togino |
| 6,876,390 | B1 | 4/2005 | Nagata |
| 7,385,767 | B2 | 6/2008 | Minakata |
| 7,515,194 | B2 | 4/2009 | Nagata et al. |
| 7,616,393 | B2 | 11/2009 | Border et al. |
| 9,547,174 | B2 | 1/2017 | Gao et al. |
| 10,467,469 | B2 * | 11/2019 | Goncharov .............. H04N 5/33 |
| 2005/0046952 | A1 | 3/2005 | Nagata et al. |
| 2005/0248861 | A1 | 11/2005 | Minakata |
| 2006/0077578 | A1 | 4/2006 | Shimo et al. |
| 2008/0291531 | A1 * | 11/2008 | Heimer .................. G02B 7/002 |
| | | | 359/726 |
| 2009/0161235 | A1 | 6/2009 | Border et al. |
| 2012/0081797 | A1 | 4/2012 | Saori et al. |
| 2015/0309315 | A1 | 10/2015 | Schowengerdt |
| 2016/0025355 | A1 | 9/2016 | Goncharov |
| 2018/0364455 | A1 | 12/2018 | Chen et al. |

FOREIGN PATENT DOCUMENTS

| | | |
|---|---|---|
| CN | 108333767 A | 7/2018 |
| EP | 1312968 | 5/2003 |
| JP | 2001166209 | 6/2001 |
| JP | 2005-300588 | 10/2005 |
| JP | 2005300588 | 10/2005 |
| JP | 2007017708 | 1/2007 |

OTHER PUBLICATIONS

Chunyu Gao, et al., "Occlusion Capable Optical See-through Head-Mounted Display Using Freeform Optics", IEEE International Symposium on Mixed and Augmented Reality 2012 Science and Technology Proceedings, Nov. 5-8, 2012, pp. 281-282.
International Search Report and Written Opinion from PCT/US2019/052244, dated Dec. 5, 2019, Apple Inc., pp. 1-12.
Office action and Search report from Japanese Application No. 201980060915.2, (Japanese version and English translation), dated Apr. 2, 2022, pp. 1-16.
Office Action in Taiwan Application No. 108133821, dated Mar. 4, 2021, pp. 1-12.
International Preliminary Report on Patentability in PCT/US2019/052244, dated Apr. 8, 2021, pp. 1-8.
Thorben Badur et al., "Hight Refractive Index Polymers by Design", 2018, pp. 1-10.
U.S. Appl. No. 17/008,524, filed Aug. 31, 2020, Takeyoshi Saiga.
Office action and Search report from Chinese Application No. 201980060915.2, (Chinese version and English translation), dated Dec. 1, 2022, pp. 1-10.
Korean Notice of Preliminary Rejection from Patent Application No. 10-2021-7007991, dated Apr. 12, 2023, pp. 1-10, English Translation Included.
Notice of Second Preliminary Rejection from Korean Patent Application No. 10-2021-7007991, dated Feb. 26, 2024, pp. 1-11 (includes English Translation).

* cited by examiner

CAMERA LENS SYSTEM

This application is a 371 of PCT Application No. PCT/US2019/052244, filed Sep. 20, 2019, which claims benefit of priority to U.S. Provisional Patent Application No. 62/736,394, filed Sep. 25, 2018. The above applications are incorporated herein by reference. To the extent that any material in the incorporated application conflicts with material expressly set forth herein, the material expressly set forth herein controls.

BACKGROUND

Technical Field

This disclosure relates generally to camera systems, and more specifically to small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a folded optical system that may, for example, be used as a camera lens in small form factor cameras. Embodiments of a folded optical system are described that include two prisms with refractive power that together form the optical system. At least one surface of at least one of the prisms is a "freeform" surface, and thus the prism(s) may be referred to as freeform prisms. A freeform prism may be broadly defined as a prism with at least one surface that provides refractive power and that is asymmetric (not rotationally symmetric) (i.e., is a "freeform" surface). The prisms provide a "folded" optical axis for the camera, for example to reduce the Z-height of the camera. A first prism (P1) redirects light from an object field from a first axis to a second axis. A second prism (P2) receives the light on the second axis and redirects the light onto a third axis on which a photosensor of the camera is disposed. The redirected light forms an image at an image plane at or near the surface of a photosensor.

Each of the two prisms includes three surfaces that affect light passing through the prism. A first surface (S1) receives the light from an object side of the prism; a second surface (S2) reflects or redirects the light received through the first surface to a third surface (S3); the light then passes through or is refracted by the third surface to the next prism or to the photosensor. For each prism, a given surface may be flat/plano with no refractive power; symmetrically concave, convex, or aspherical with refractive power; or freeform (asymmetrically concave, convex, or aspherical with refractive power). As noted above, in some embodiments, at least one surface of at least one of the prisms is a freeform surface. In some embodiments, at least two of the six surfaces of the prisms in the optical system are freeform surfaces. In some embodiments, the first and third surfaces in both prisms are freeform surfaces, while the second surfaces in both prisms are flat/plano. However, in some embodiments, one or both of the second surfaces may be freeform surfaces with refractive power or symmetrical surfaces with refractive power.

The materials and surfaces of the prisms in the optical system may be selected to capture high resolution, high quality images. Parameters and relationships of the prisms, including but not limited to the materials and surface shapes may be selected at least in part to reduce, compensate, or correct for optical aberrations and artifacts and effects across the field of view. In some embodiments, the materials and surfaces of the prisms in the optical system may be selected to provide a low F-number (e.g., <=2.4), full field of view (FOV) of 30 degrees or less, and high brightness, high resolution images with high image quality.

In some embodiments, an aperture stop is located in the optical system at the first (object side) surface of the first prism. In some embodiments, the aperture stop may be elliptical; however, circular or other shapes may be used for the aperture in some embodiments. In some embodiments, the folded camera may include an infrared (IR) filter to reduce or eliminate interference of environmental noise on the photosensor. The IR filter may, for example, be located between the second prism and the photosensor.

Figure 1:
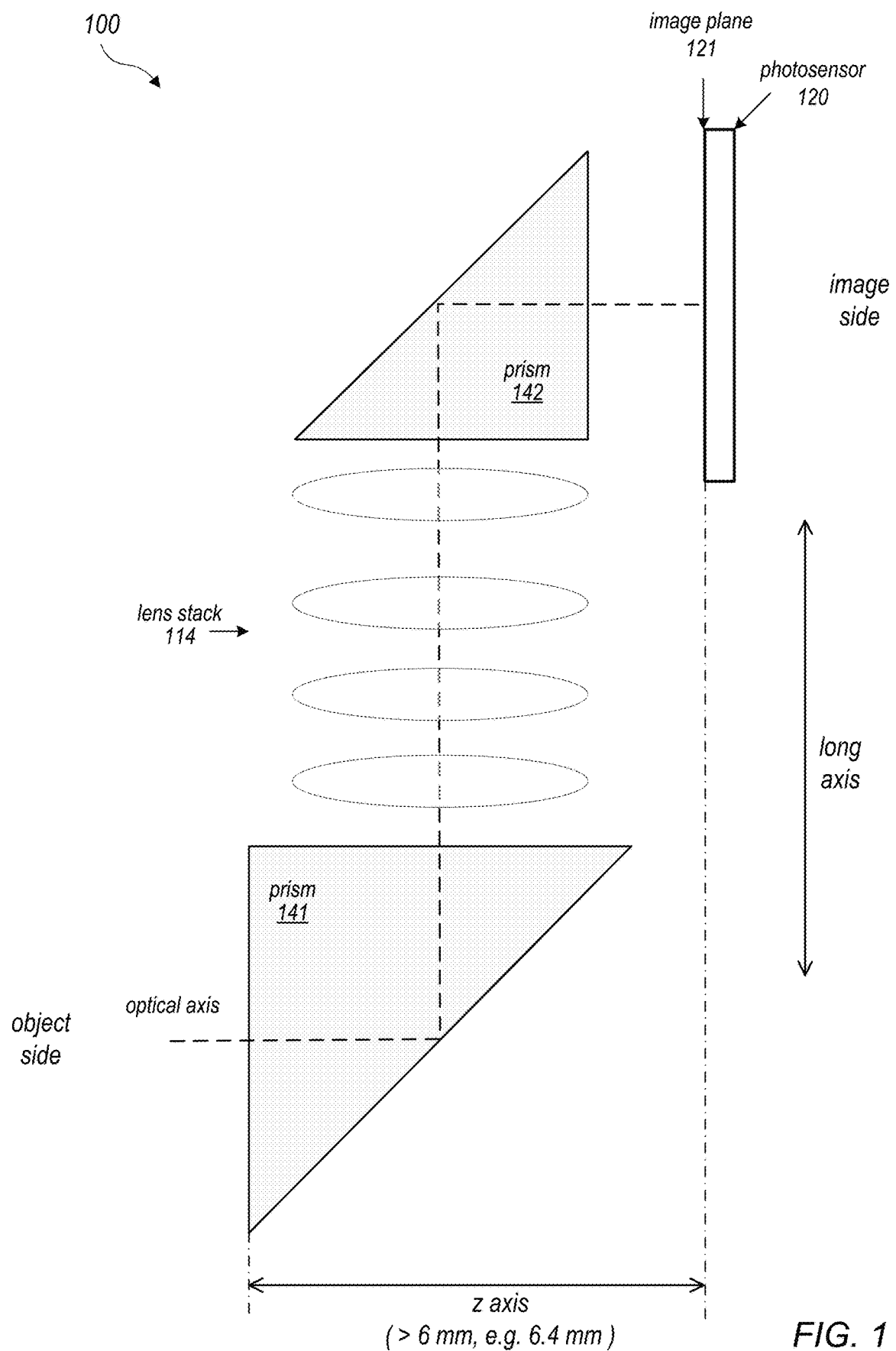
FIG. 1 illustrates a conventional folded lens system that includes a lens stack positioned between two prisms.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a folded optical system are described that include two prisms with refractive power that together form the optical system. At least one surface of at least one of the prisms is a "freeform" surface, and thus the prism(s) may be referred to as freeform prisms. A freeform prism may be broadly defined as a prism with at least one surface that provides refractive power and that is asymmetric (not rotationally symmetric) (i.e., is a "freeform" surface).

Figure 8:
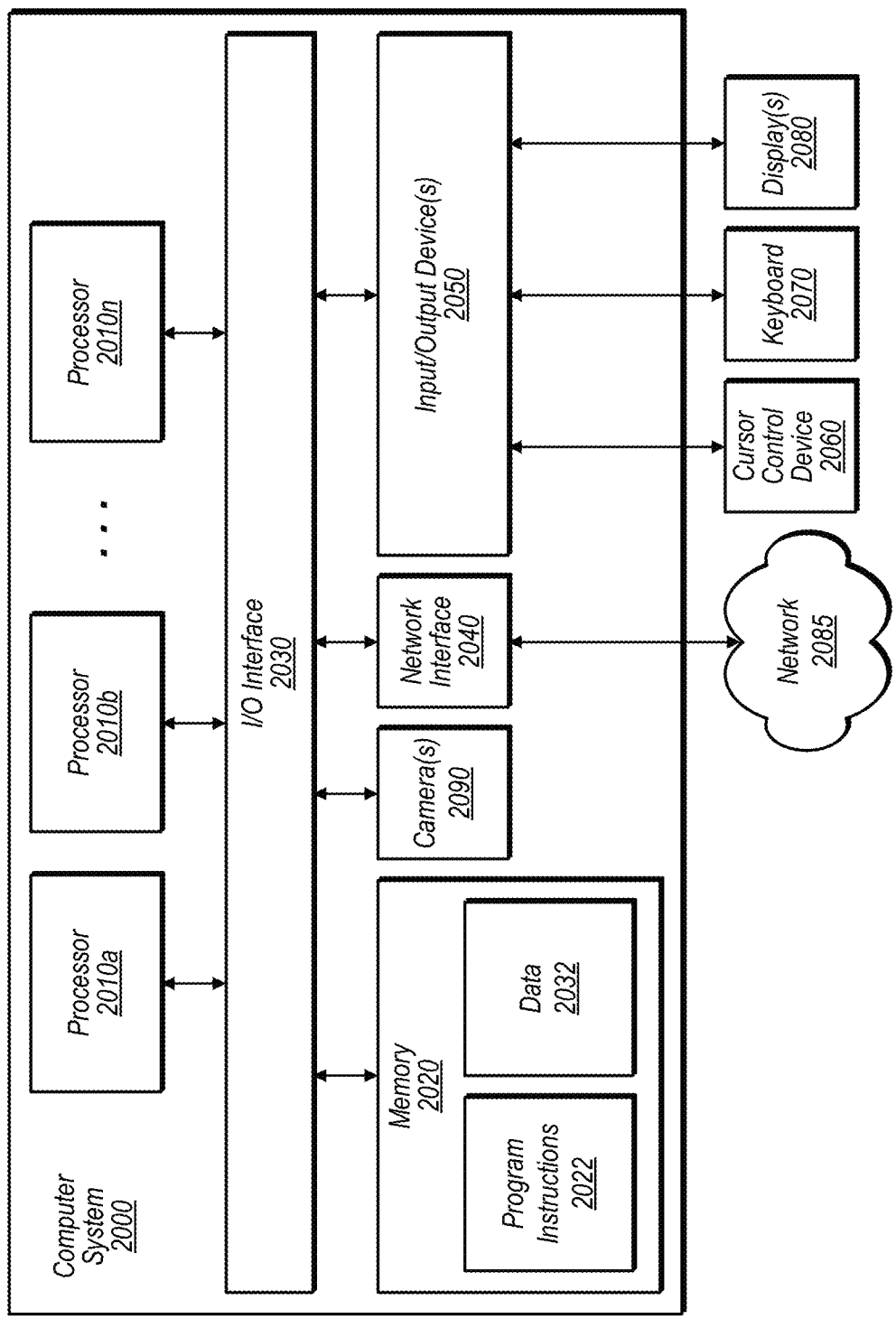
FIG. 8 illustrates an example computer system that may be used in embodiments.

Embodiments of the folded optical system as described herein may be implemented in a small package size while still capturing sharp, high-resolution images, making embodiments of a camera including the optical system suitable for use in small and/or mobile multipurpose devices such as cell phones, smartphones, pad or tablet computing devices, laptop, netbook, notebook, subnotebook, and ultrabook computers, and so on. FIG. 8 illustrates an example device that may include one or more small form factor cameras that use embodiments of the folded optical system as described herein. However, note that aspects of the camera (e.g., the optical system and photosensor) may be scaled up or down to provide cameras with larger or smaller package sizes. In addition, embodiments of the camera may be implemented as stand-alone digital cameras. In addition to still (single frame capture) camera applications, embodiments of the camera may be adapted for use in video camera applications.

FIG. 1 illustrates a conventional folded camera 100 that includes a lens stack positioned between two prisms, according to some embodiments. The prisms 141 and 142 provide a "folded" optical axis for the camera 100, for example to reduce the Z-height of the camera 100 when compared to conventional straight camera lenses. A lens stack 114 including one or more refractive lens elements is located between prisms 141 and 142. A first prism 141 redirects light from an object field from a first axis to the lens stack 114 on a second axis. The lens element(s) in the lens stack 114 refract the light to a second prism 142 that redirects the light onto a third axis on which a photosensor 120 of the camera 100 is disposed. The redirected light forms an image at an image plane 121 at or near the surface of the photosensor 120.

Figure 2:
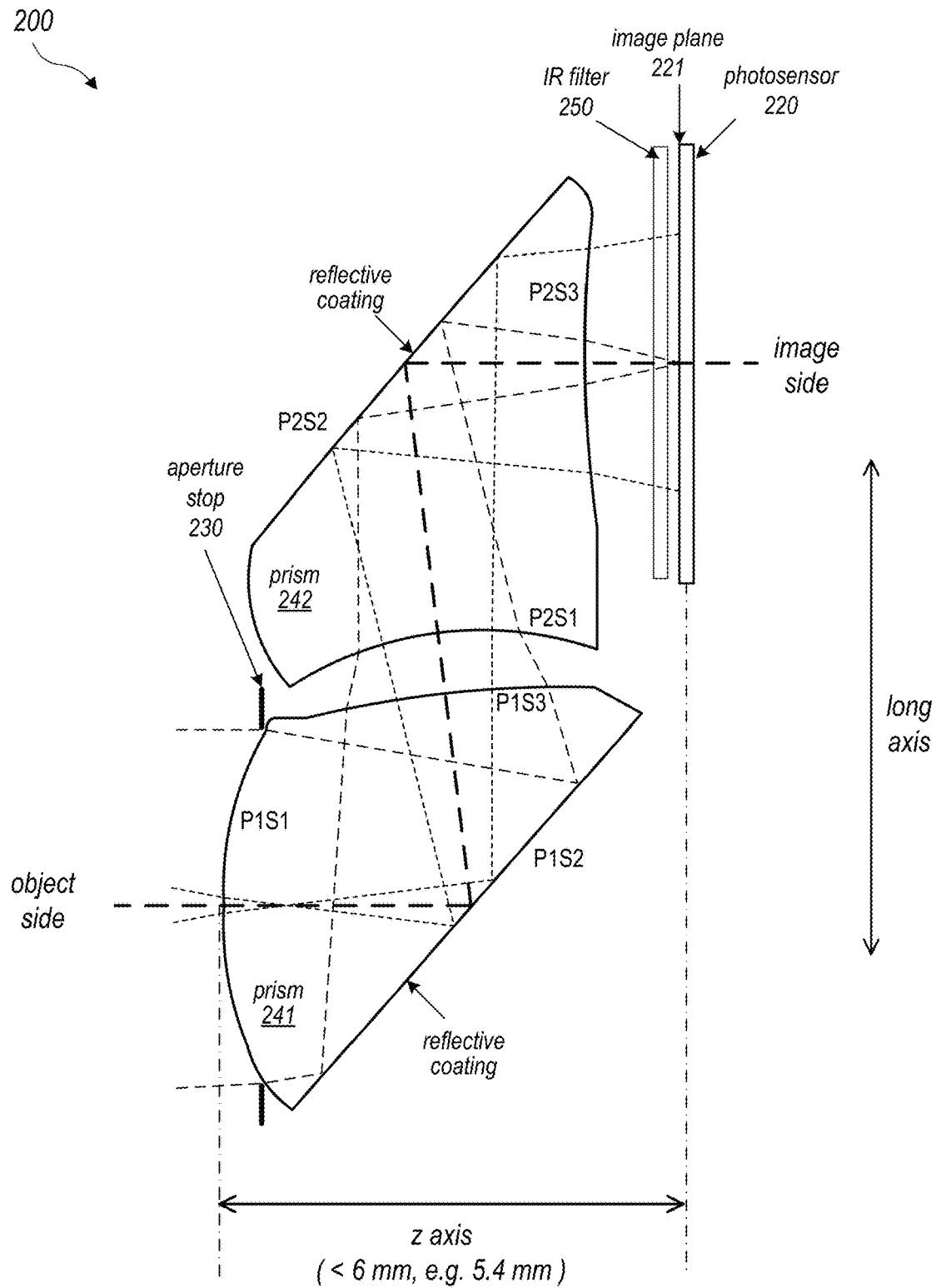
FIG. 2 illustrates a folded optical system that consists of two freeform prisms, according to some embodiments.

FIG. 2 illustrates a camera 200 that includes a folded optical system that consists of two freeform prisms 241 and 242 with refractive power, according to some embodiments. The prisms 241 and 242 provide a "folded" optical axis for the camera 200, for example to reduce the Z-height of the camera. For example, a camera 100 with a conventional folded lens system as illustrated in FIG. 1 may have a Z-axis height of >6 mm, for example 6.4 mm, while a camera 200 with a folded optical system as illustrated in FIG. 2 may have a Z-axis height of <6 mm, for example 5.4 mm, while providing similar performance to the camera 100 of FIG. 1. In addition, the freeform prisms 241 and 242 in the folded optical system of camera 200 may eliminate the need for a lens stack between the prisms as shown in the camera 100 of FIG. 1, which may reduce the length of the long axis of the camera 200 when compared to the camera 100 of FIG. 1. Further, the folded optical system of FIG. 2 requires fewer optical elements (two freeform prism) when compared to the folded lens system of FIG. 1 (two prisms and at least one refractive lens element in the lens stack). Having fewer optical elements may, for example, simplify packaging and alignment of the optical system during manufacture when compared to the lens system of FIG. 1.

In the folded optical system of FIG. 2, a first freeform prism 241 (P1) receives light from an object field through an aperture stop 230 and refracts and redirects the light from a first axis to a second axis. Prism 241 includes three surfaces that affect light passing through the prism 241. A first surface (P1S1) refracts light received from an object field through aperture stop 230; a second surface (P1S2) reflects or redirects the light to a third surface (P1S3); the light is refracted by the third surface to the second prism 242.

A second freeform prism 242 (P2) receives the light on the second axis and refracts and redirects the light onto a third axis on which a photosensor 220 of the camera is disposed.

The refracted and redirected light forms an image at an image plane 221 at or near the surface of the photosensor 220. Prism 242 includes three surfaces that affect light passing through the prism 242. A first surface (P2S1) refracts light received from the first prism 241; a second surface (P2S2) reflects or redirects the light to a third surface (P2S3); the light is refracted by the third surface to form an image at an image plane 221 at or near the surface of the photosensor 220. In some embodiments, an infrared (IR) filter 250 may be located between the second prism 242 and the photosensor 220.

For each prism in the folded optical system, a given surface may be flat/plano with no refractive power; symmetrically concave, convex, or aspherical with refractive power; or freeform (asymmetrically concave, convex, or aspherical with refractive power). As noted above, in some embodiments, at least one surface of at least one of the prisms is a freeform surface. In some embodiments, at least two of the six surfaces of the prisms in the optical system are freeform surfaces. In some embodiments, the first and third surfaces in both prisms are freeform surfaces, while the second surfaces in both prisms are flat/plano. However, in some embodiments, one or both of the second surfaces may be freeform surfaces with refractive power or symmetrical surfaces with refractive power.

In the example embodiment illustrated in FIG. 2, P1S1 is a freeform convex surface with positive refractive power, P1S2 is a flat/plano surface, P1S3 is a freeform convex surface with positive refractive power, P2S1 is a freeform concave surface with negative refractive power, P2S2 is a flat/plano surface, and P2S3 is a freeform concave surface with negative refractive power. In some embodiments, P1S2 and P2S2 may be coated with a reflective material to redirect light. However, in some embodiments, at least one of P1S2 and P2S2 may reflect light via total internal reflection (TIR). Further, in some embodiments, one or both of P1S2 and P2S2 may be freeform surfaces with refractive power or symmetrical surfaces with refractive power.

The materials and surfaces of prisms 241 and 242 may be selected to capture high resolution, high quality images. Parameters and relationships of the prisms 241 and 242, including but not limited to the materials and surface shapes may be selected at least in part to reduce, compensate, or correct for optical aberrations and artifacts and effects across the field of view. In some embodiments, the materials and surfaces of the prisms in the optical system may be selected to provide a low F-number (e.g., <=2.4), full field of view (FOV) of 30 degrees or less, and high brightness, high resolution images with high image quality.

In some embodiments, an aperture stop 230 is located in the folded optical system at the first (object side) surface of the first prism 241. In some embodiments, the aperture stop 230 may be elliptical; however, circular or other shapes may be used for the aperture in some embodiments. In some embodiments, the camera 200 may include an infrared (IR) filter 250 to reduce or eliminate interference of environmental noise on the photosensor 220. The IR filter 250 may, for example, be located between the second prism 242 and the photosensor 220.

Figure 3A:
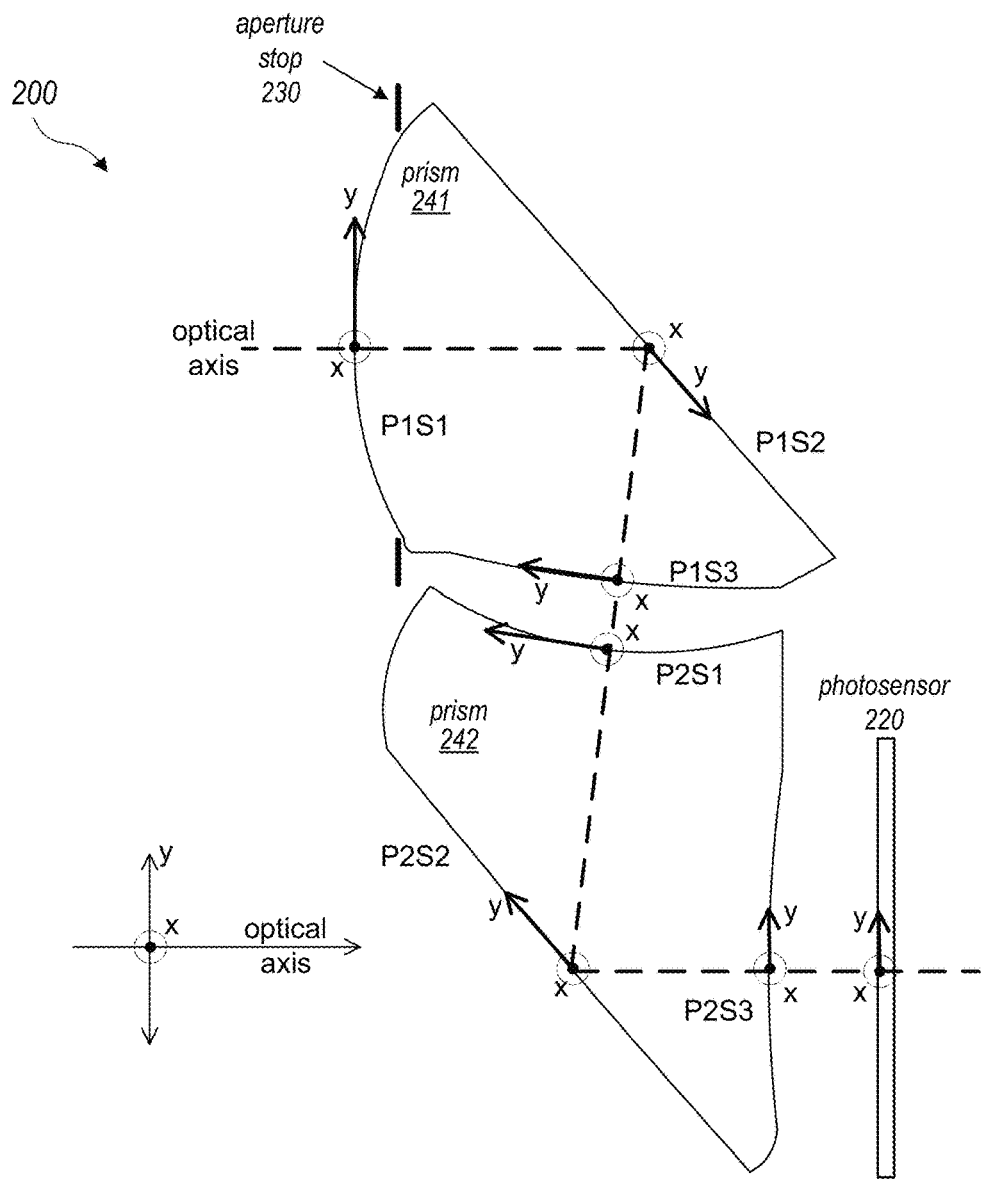
FIGS. 3A, 3B, and 3C are diagrams illustrating orientation of the x and y axes at the surfaces of the freeform prisms as shown in FIG. 2, according to some embodiments.
Figure 3B:
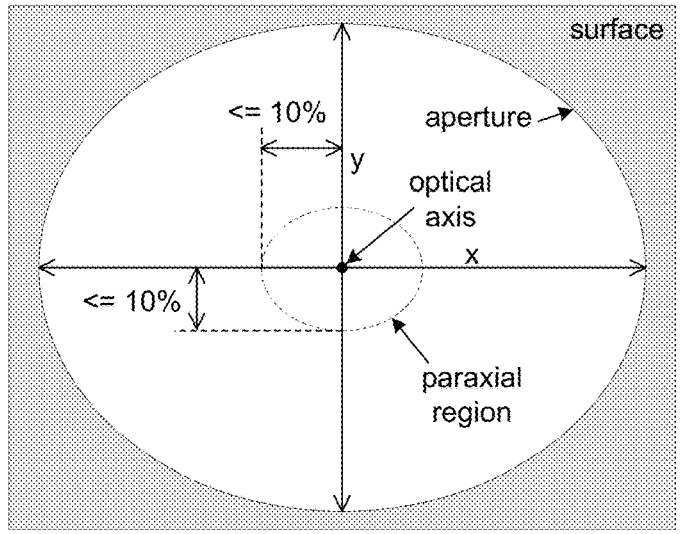
Figure 3C:
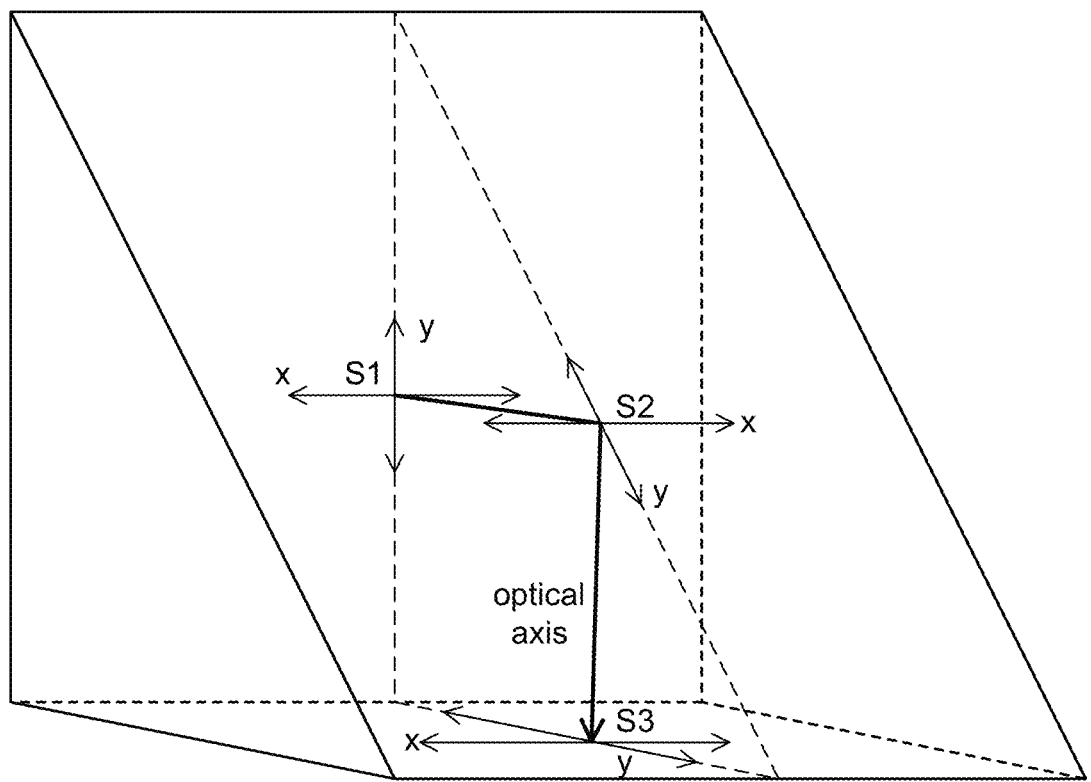

FIGS. 3A, 3B, and 3C are diagrams illustrating orientation of the x and y axes at the surfaces of the freeform prisms as shown in FIG. 2, according to some embodiments. FIG. 3A is s cross-sectional illustration of a folded optical system, according to some embodiments. Referring to FIG. 3A, optical characteristics of the freeform surfaces of the prisms in an optical system as illustrated in FIG. 2 may be defined for a paraxial region of the surfaces along two axes of symmetry (x and y) relative to the optical axis at the surfaces of the prisms 241 and 242. As shown in FIG. 3A, the optical axis is a line that passes through surface P1S1 at a center point of aperture stop 230 and perpendicular to a tangent plane at that point of surface P1S1. A light ray on the optical axis passes through the folded optical system to strike at or near the center of photosensor 220 and perpendicular to the surface plane of photosensor 220. At the photosensor, the x axis corresponds to a horizontal axis of the photosensor 220 that intersects the optical axis, and the y axis corresponds to a vertical axis of the photosensor 220 that intersects the optical axis. The y axis and the optical axis are on the plane of the cross-section, and the x axis is perpendicular to the plane of the cross-section. At each surface of prisms 241 and 242, the x axis is on a tangent plane at the intersection of the optical axis with the surface and is parallel to the x axis at the photosensor 220 and perpendicular to the optical axis. However, at each surface of prisms 241 and 242, the y axis rotates around the x axis to conform to the tangent plane, and thus is not necessarily parallel to the y axis at the photosensor 220. FIG. 3C graphically illustrates the x, y, and optical axes on a 3D model of a prism. As shown in FIG. 3C, the x axes at S1, S2, and S3 are parallel to each other and perpendicular to the optical axis. However, the y axis at each surface rotates around the x axis to conform to the tangent plane at the respective surface.

As noted above, the optical characteristics of the freeform surfaces of the prisms in an optical system as illustrated in FIG. 2 may be defined for a paraxial region around the optical axis along two axes of symmetry (x and y). FIG. 3B graphically illustrates the effective aperture and paraxial region of a surface of a prism as illustrated in FIG. 3A. At P1S1, the aperture is defined by aperture stop 230. At each successive surface (P1S2, P1S3, P2S1, P2S2, and P2S3), the aperture may be defined by the light that the surface receives from the preceding surface. As previously noted, in some embodiments, the aperture stop 230 may be elliptical; however, circular or other shapes may be used for the aperture in some embodiments. FIG. 3C shows the x and y axes at the aperture as previously defined at the surface. The paraxial region is a region around the optical axis that extends 10% or less of the width of the aperture in each direction from the optical axis on the x and y axes.

Figure 4:
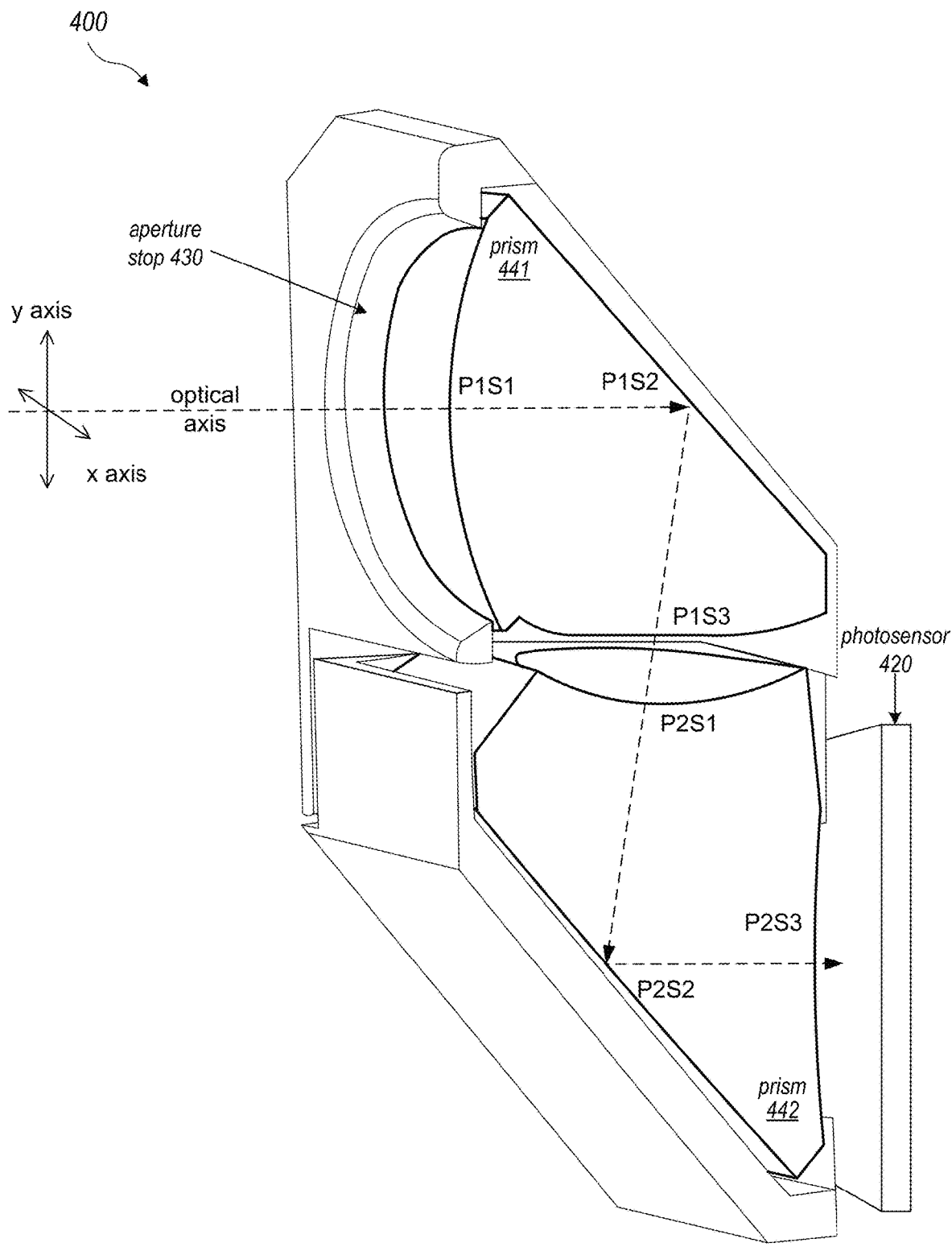
FIG. 4 is a 3D cross-sectional illustration of a folded optical system that includes two freeform prisms, according to some embodiments.

FIG. 4 is a 3D cross-sectional illustration of an example folded optical system that includes two freeform prisms, according to some embodiments. A telephoto camera 400 may include a folded optical system that consists of two freeform prisms 441 and 442. An aperture stop may be located at a first (object side) surface of the first prism 441. The aperture stop may be elliptical or circular. The camera 400 also includes a photosensor 420. In some embodiments, an infrared filter may be located between the second prism 442 and the photosensor. In some embodiments, the folded optical system may be configured to provide a low F-number (e.g., <=2.4), full field of view (FOV) of 30 degrees or less, and high brightness, high resolution images with high image quality.

The folded optical system consists of two freeform prisms 441 (P1) and 442 (P2). Each of the two prisms 441 and 442 includes three surfaces that affect light passing through the prism. A first surface (S1) receives the light from an object side of the prism; a second surface (S2) reflects or redirects the light received through the first surface to a third surface (S3); the light then passes through or is refracted by the third surface to the next prism or to the photosensor 420. Each of the prisms includes at least one freeform surface in the imaging path that is not rotationally symmetric.

At prism 441, incoming light through aperture stop 430 is converged by P1S1, reflected by P1S2, and converged by P1S3 to exit prism 441. At prism 442, the light from prism 441 is diverged by P2S1, reflected by P2S2, diverged by P2S3, and exits prism 442 to form an image at an image plane at or near the surface of photosensor 420. The folding surfaces (surfaces P1S2 and P2S2) may reflect light either through total internal reflection (TIR) or via a mirror coating.

In some embodiments, the aperture stop 430 of the folded optical system is at or near the object side surface (P1S1) of prism 441. In some embodiments, the aperture stop 430 is at or near (within 0.3 mm) surface P1S1 for imaging purposes.

In some embodiments, the folded optical system has same focal lengths along the x axis and along the y axis. The folded optical system satisfies the following condition:

$$f_x = f_y = f_{sys},$$

where $f_x$ is the focal length through the folded optical system on the x axis, $f_y$ is the focal length through the folded optical system on the y axis, and $f_{sys}$ is the effective focal length of the folded optical system.

For each of the prisms 441 and 442, focal lengths along the x axis ($f_{P1X}$, $f_{P2X}$) are different than focal lengths along the y axis ($f_{P1Y}$, $f_{P2Y}$), respectively, which defines both prisms 441 and 442 as freeform prisms:

$$f_{P1X} \neq f_{P1Y}, f_{P2X} \neq f_{P2Y}.$$

In some embodiments, an optional infrared cutoff filter (IRCF) is positioned in front of the photosensor 420 to remove unwanted infrared light and thus improve the signal-to-noise ratio (SNR).

Figure 5:
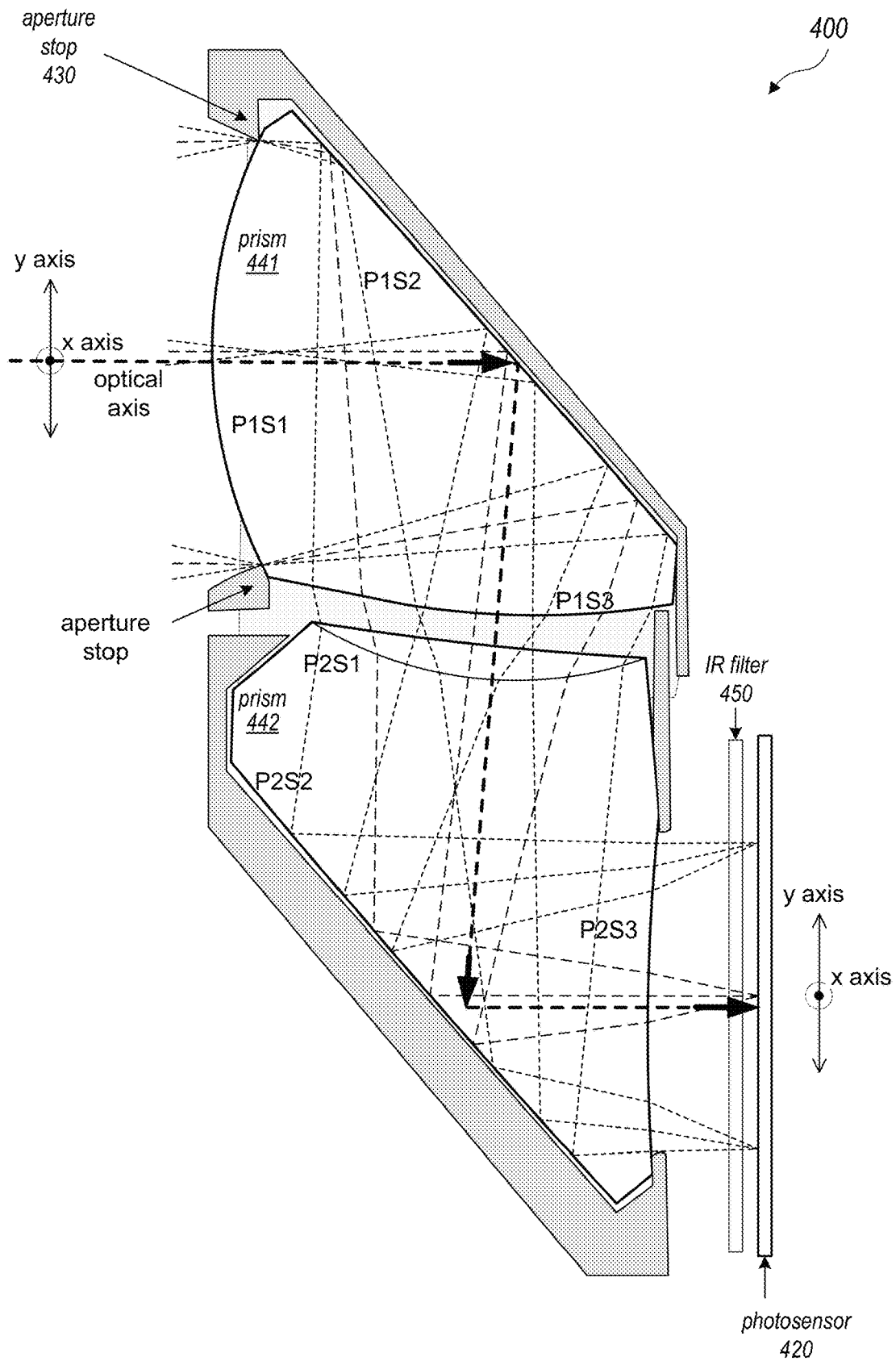
FIG. 5 is a cross-sectional illustration of a folded optical system that includes two freeform prisms, according to some embodiments.

FIG. 5 is a cross-sectional illustration of an example folded optical system as illustrated in FIG. 4 that includes two freeform prisms 441 and 442, according to some embodiments. On the optical axis, prism 441 includes three surfaces with power. The refractive power of prism 441 along the x axis is stronger than the refractive power along the y axis. Prism 441 satisfies the following conditions:

$$0.55 < f_{P1y}/f_{sys} < 0.85$$

$$0.5 < f_{P1x}/f_{sys} < 0.8$$

where $f_{P1y}$ is the focal length of prism 441 along the y axis, $f_{P1x}$ is the focal length of prism 441 along the x axis, and $f_{sys}$ is the effective focal length of the freeform folded optical system.

Prism 441 has three surfaces along the optical axis from an object side to an image side: P1S1, P1S2, and P1S3. P1S1 is convex in the paraxial region, and satisfies the following conditions:

$$1.2 < f_{P1S1y}/f_{P1y}$$

$$f_{P1S1x}/f_{P1x} < 2.8$$

where $f_{P1S1y}$ and $f_{P1S1x}$ are focal lengths of surface P1S1 on the y and x axes, respectively.

P1S2 is reflective coated to reflect visible light and fold the optical axis.

P1S3 is convex in the paraxial region, and satisfies the following conditions:

$$1 < f_{P1S3x}/f_{P1x} < 3$$

$$4 < f_{P1S3y}/f_{P1y} < 5$$

where $f_{P1S3y}$ and $f_{P1S3x}$ are focal lengths of surface P1S3 on the y and x axes, respectively.

In some embodiments, prism 441 may be formed of an optical plastic material. In some embodiments, prism 441 is formed of an optical material with an Abbe number vd1 that satisfies the following condition:

$$vd1 > 50.$$

On the optical axis, prism 442 includes three surfaces with power. The refractive power of prism 442 along x axis is stronger than that along the y axis. Prism 442 satisfies the following conditions:

$$-1 < f_{P2y}/f_{sys} < -0.4$$

$$-1 < f_{P2x}/f_{sys} < -0.7$$

where $f_{P2y}$ is the focal length of prism 442 along the y axis, $f_{P2x}$ is the focal length of prism 442 along the x axis, and $f_{sys}$ is the effective focal length of the freeform folded optical system.

Prism 442 has three surfaces along the optical axis from an object side to an image side: P2S1, P2S2, and P2S3. P2S1 is concave in the paraxial region, and satisfies the following conditions:

$$1 < f_{P2S1y}/f_{P2y}$$

$$f_{P2S1x}/f_{P2x} < 3$$

where $f_{P2S1y}$ and $f_{P2S1x}$ are focal lengths of surface P2S1 on the y and x axes, respectively.

P2S2 is reflective coated to reflect visible light and fold the optical axis.

P2S3 is concave in the paraxial region, and satisfies the following conditions:

$$3 < f_{P2S3x}/f_{P2y} < 7$$

$$1 < f_{P2S3y}/f_{P2y} < 3$$

where $f_{P2S3y}$ and $f_{P2S3x}$ are focal lengths of surface P2S3 on the y and x axes, respectively.

In some embodiments, prism 442 may be formed of an optical plastic material. In some embodiments, prism 442 is formed of an optical material with an Abbe number vd2 that satisfies the following condition:

$$vd2 < 30$$

Figure 6:
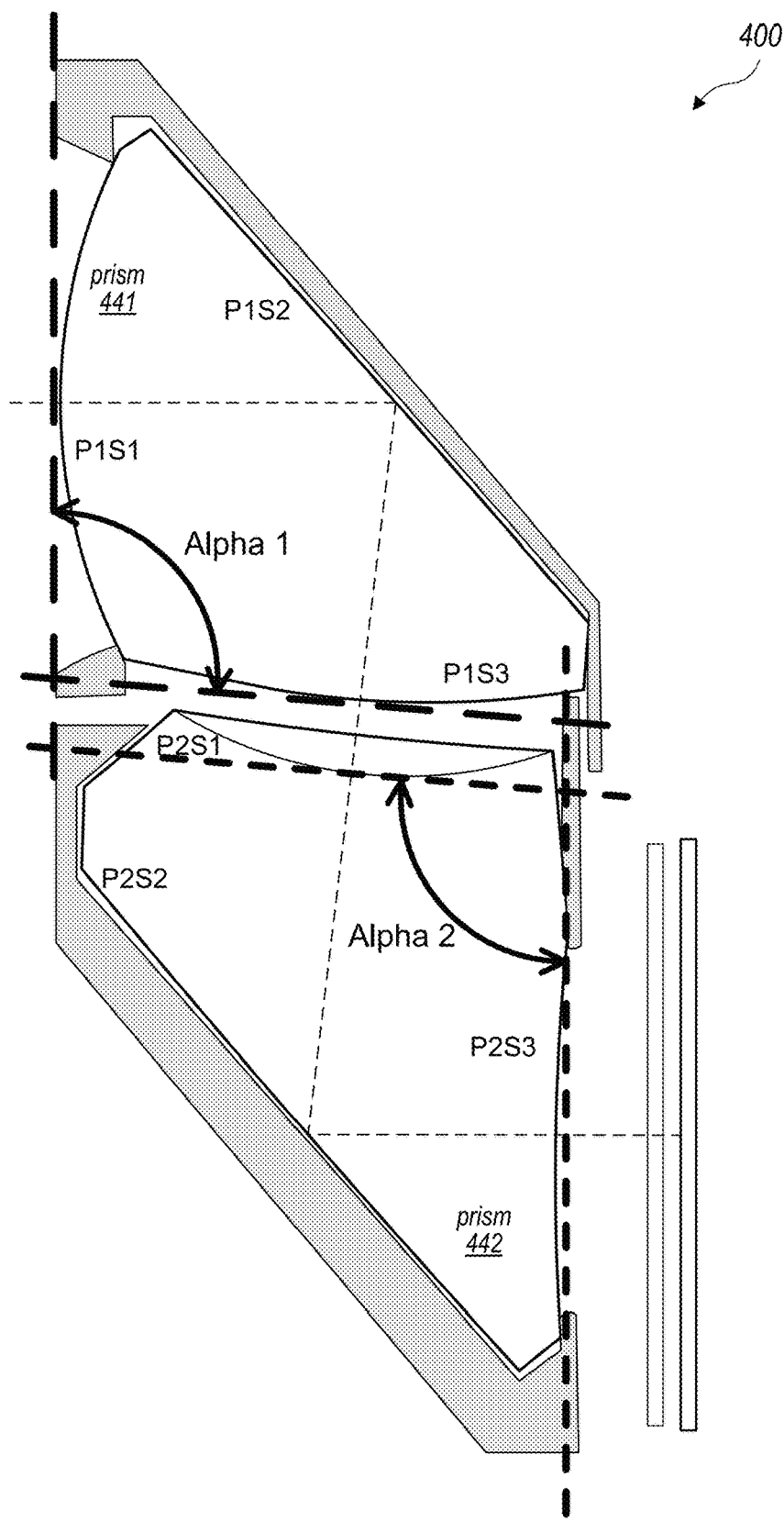
FIG. 6 is a cross-sectional illustration of a folded optical system that includes two freeform prisms and shows the angles between the surfaces of the freeform prisms, according to some embodiments.

FIG. 6 is a cross-sectional illustration of an example folded optical system that includes two freeform prisms and shows the angles between surfaces of the freeform prisms, according to some embodiments. The angle between the tangent line of P1S1 and the tangent line of P1S3 is Alpha 1. In some embodiments, Alpha 1 satisfies the following condition:

70 degrees < Alpha 1 < 110 degrees

The angle between the tangent line of P2S1 and the tangent line of P2S3 is Alpha 2. In some embodiments, Alpha 2 satisfies the following condition:

70 degrees < Alpha 2 < 110 degrees

Example Flowchart

Figure 7:
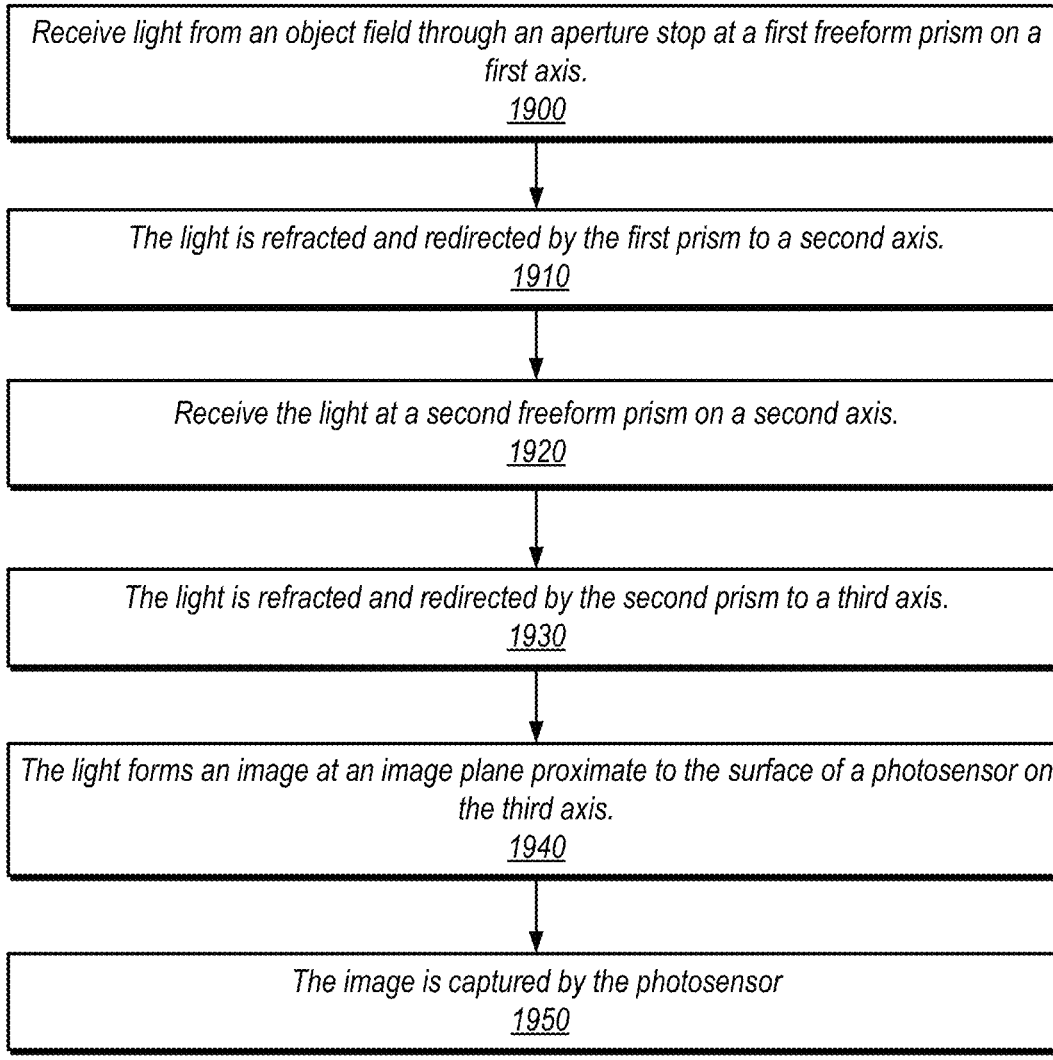
FIG. 7 is a flowchart of a method for capturing images using embodiments of a folded optical system as illustrated in FIGS. 2 through 6, according to some embodiments.

FIG. 7 is a flowchart of a method for capturing images using embodiments of a camera as illustrated in FIGS. 2 through 6, according to some embodiments. As indicated at 1900, light from an object field in front of the camera is received through an aperture stop at a first surface of a first freeform prism on a first axis. As indicated at 1910, the light is refracted and redirected by the first freeform prism to a second axis. As indicated at 1920, the light is received at a first surface of a second freeform prism. As indicated at 1930, the light is refracted and redirected by the second freeform prism to a third axis. As indicated at 1940, the light forms an image at an image plane at or near the surface of a photosensor or sensor module on the third axis. As indicated at 1950, the image is captured by the photosensor.

While not shown in FIG. 7, in some embodiments, the light may pass through an infrared filter that may for example be located between the second freeform prism and the photosensor.

In some embodiments, the components of the folded optical system referred to in FIG. 7 may be configured as illustrated in any of FIG. 2, 3, 4, 5, or 6. However, note that variations on the examples given in the Figures are possible while achieving similar optical results.

Example Computing Device

FIG. 8 illustrates an example computing device, referred to as computer system 2000, that may include or host embodiments of a camera with a folded optical system as illustrated in FIGS. 2 through 7. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 2 through 7, which may also be coupled to I/O interface 2030, or one or more cameras as described above with respect to FIGS. 2 through 7 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 8, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A folded optical system, comprising:
   a first prism; and
   a second prism;
   wherein the first prism has refractive power and has only one reflecting surface for internally reflecting light and is configured to redirect the light received from an object field, toward the second prism;
   wherein the second prism has only one reflecting surface for internally reflecting the light and is configured to redirect the light to form an image of the object field at an image plane;
   wherein for the first prism or the second prism, the respective reflecting surface is flat/plano; and
   wherein at least one surface of at least one of the prisms is rotationally asymmetric and the at least one surface provides refractive power to the light that passes through the at least one surface.

2. The folded optical system as recited in claim 1, further comprising an aperture stop located at a first surface of the first prism.

3. The folded optical system as recited in claim 1, wherein F-number of the folded optical system is <=2.4, and wherein full field of view (FOV) of the folded optical system is <=30 degrees.

4. The folded optical system as recited in claim 1, wherein each prism has a respective first surface S1, a respective second surface S2, and a respective third surface S3 on an optical axis of the folded optical system, wherein optical characteristics of the surfaces are defined along two axes of symmetry x and a y relative to the optical axis at the surfaces, wherein the x axis at the surfaces are parallel to each other and perpendicular to the optical axis, and wherein the y axis at each surface is rotated around the x axis to conform to the surface.

5. The folded optical system as recited in claim 4, wherein the folded optical system satisfies the following condition:

$$f_x = f_y = f_{sys},$$

where $f_x$ is focal length through the folded optical system on the x axis, $f_y$ is focal length through the folded optical system on the y axis, and $f_{sys}$ is effective focal length of the folded optical system.

6. The folded optical system as recited in claim 4, wherein, for each prism, focal lengths along the x axis at the prism are different than focal lengths along the y axis at the prism.

7. The folded optical system as recited in claim 4, wherein refractive power of the first prism along the x axis is stronger than refractive power of the first prism along the y axis.

8. The folded optical system as recited in claim 7, wherein the first prism satisfies the following conditions:

$$0.55 < f_{P1y}/f_{sys} < 0.85,$$

$$0.5 < f_{P1x}/f_{sys} < 0.8,$$

where $f_{P1y}$ is focal length of the first prism along the y axis, $f_{P1x}$ is focal length of the first prism along the x axis, and $f_{sys}$ is effective focal length of the folded optical system.

9. The folded optical system as recited in claim 4, wherein surface S1 of the first prism is convex in a paraxial region and satisfies the following conditions:

$$1.2 < f_{P1S1y}/f_{P1y},$$

$$f_{P1S1x}/f_{P1x} < 2.8,$$

where $f_{P1S1y}$ and $f_{P1S1x}$ are focal lengths of surface S1 of the first prism on the y and x axes, respectively.

10. The folded optical system as recited in claim 4, wherein surface S3 of the first prism is convex in a paraxial region and satisfies the following conditions:

$$1 < f_{P1S3x}/f_{P1x} < 3,$$

$$4 < f_{P1S3y}/f_{P1y} < 5,$$

where $f_{P1S3y}$ and $f_{P1S3x}$ are focal lengths of surface S3 of the first prism on the y and x axes, respectively.

11. The folded optical system as recited in claim 4, wherein refractive power of the second prism along the x axis is stronger than refractive power of the second prism along the y axis.

12. The folded optical system as recited in claim 11, wherein the second prism satisfies the following conditions:

$$-1 < f_{P2y}/f_{sys} < -0.4,$$

$$-1 < f_{P2x}/f_{sys} < -0.7,$$

where $f_{P2y}$ is focal length of the second prism along the y axis, $f_{P2x}$ is focal length of the second prism along the x axis, and $f_{sys}$ is the effective focal length of the folded optical system.

13. The folded optical system as recited in claim 4, wherein surface S1 of the second prism is concave in the paraxial region, and satisfies the following conditions:

$$1 < f_{P2S1y}/f_{P2y},$$

$$f_{P2S1x}/f_{P2x} < 3,$$

where $f_{P2S1y}$ and $f_{P2S1x}$ are focal lengths of surface S1 of the second prism on the y and x axes, respectively.

14. The folded optical system as recited in claim 4, wherein surface S3 of the second prism is concave in a paraxial region and satisfies the following conditions:

$$3 < f_{P2S3x}/f_{P2y} < 7$$

$$1 < f_{P2S3y}/f_{P2y} < 3, ,$$

where $f_{P2S3y}$ and $f_{P2S3x}$ are focal lengths of surface S3 of the second prism on the y and x axes, respectively.

15. The folded optical system as recited in claim 4,
wherein surface S2 of the first prism reflects light from a first axis to a second axis;
wherein surface S2 of the second prism reflects light from the second axis to a third axis; and
wherein at least one of the surfaces S2 is rotationally asymmetric.

16. The folded optical system as recited in claim 4, wherein the first prism satisfies the following condition:

$$70 \text{ degrees} < \text{Alpha } 1 < 110 \text{ degrees},$$

where Alpha 1 is the angle between a tangent line to surface S1 of the first prism and a tangent line to surface S3 of the first prism.

17. The folded optical system as recited in claim 4, wherein the second prism satisfies the following condition:

$$70 \text{ degrees} < \text{Alpha } 2 < 110 \text{ degrees},$$

where Alpha 2 is the angle between a tangent line to surface S1 of the second prism and a tangent line to surface S3 of the second prism.

18. The folded optical system as recited in claim 1, wherein the first prism is formed of an optical material with an Abbe number vd1 that satisfies the condition vd1>50, and wherein the second prism is formed of an optical material with an Abbe number vd2 that satisfies the condition vd2<30.

19. The folded optical system as recited in claim 1, wherein the folded optical system is a component of a camera comprising a photosensor configured to capture light projected onto a surface of the photosensor, wherein the second prism redirects the light to form the image of the object field at the image plane at the surface of the photosensor.

20. The folded optical system as recited in claim 19, wherein the camera is a component of a device comprising:
one or more processors; and
a memory comprising program instructions executable by at least one of the one or more processors to control operations of the camera.

* * * * *